No. 634,274. Patented Oct. 3, 1899.
M. J. F. SCANLAN.
COMBINED SNOW PLOW AND DUMPING CART.
(Application filed Aug. 18, 1898.)
(No Model.) 4 Sheets—Sheet 1.
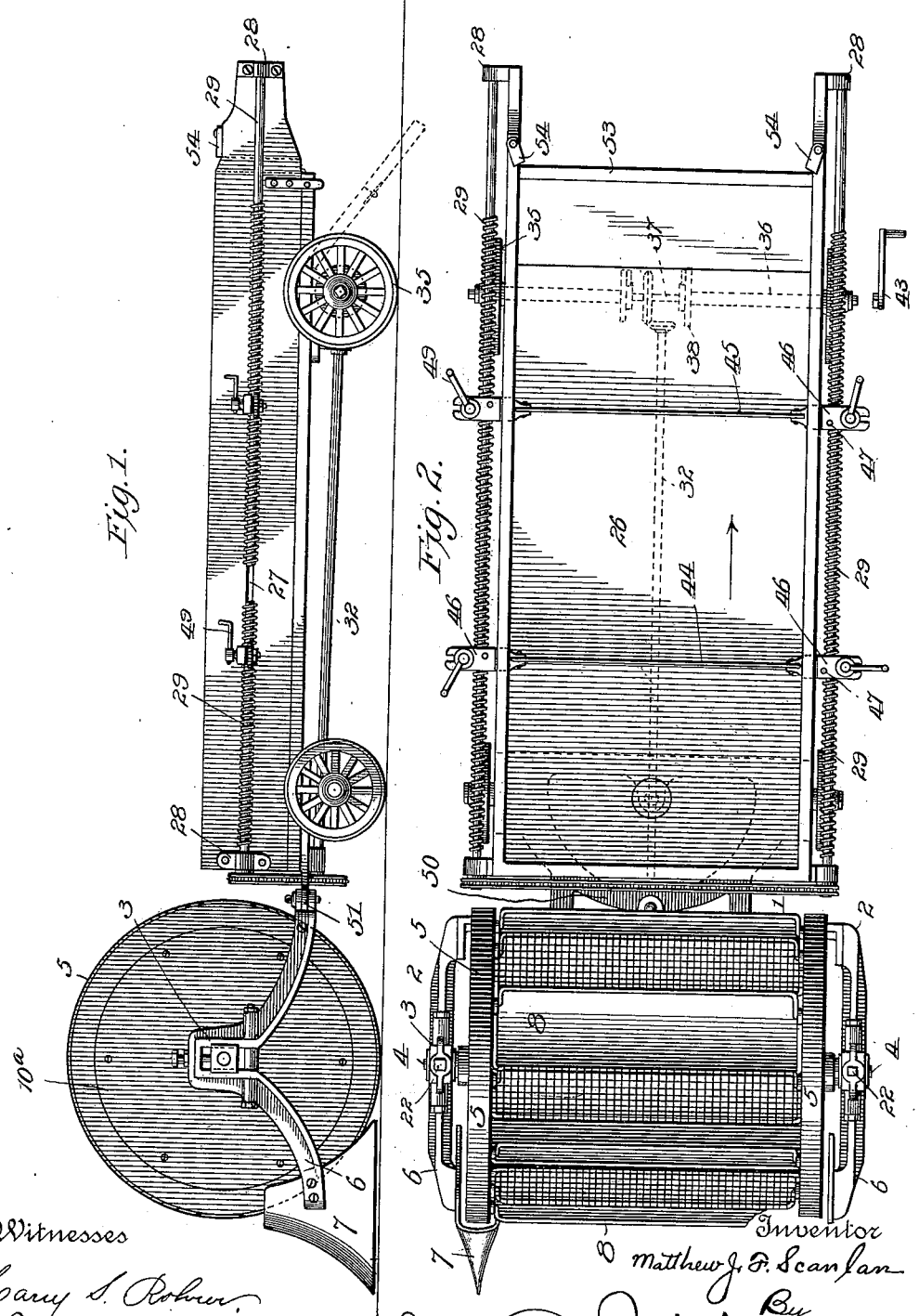

No. 634,274.  
M. J. F. SCANLAN.  
COMBINED SNOW PLOW AND DUMPING CART.  
(Application filed Aug. 18, 1898.)

Patented Oct. 3, 1899.

(No Model.)

4 Sheets—Sheet 2.

Witnesses  
Harry S. Rohrer  
J. V. McCleary

Inventor  
Matthew J. F. Scanlan  
By his Attorneys

No. 634,274. Patented Oct. 3, 1899.
M. J. F. SCANLAN.
COMBINED SNOW PLOW AND DUMPING CART.
(Application filed Aug. 18, 1898.)

(No Model.) 4 Sheets—Sheet 3.

Witnesses

Inventor
Matthew J. F. Scanlan
By his Attorneys

No. 634,274. Patented Oct. 3, 1899.
M. J. F. SCANLAN.
COMBINED SNOW PLOW AND DUMPING CART.
(Application filed Aug. 18, 1898.)
(No Model.) 4 Sheets—Sheet 4.
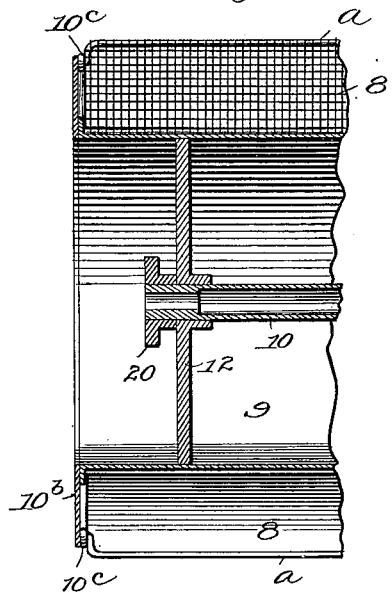
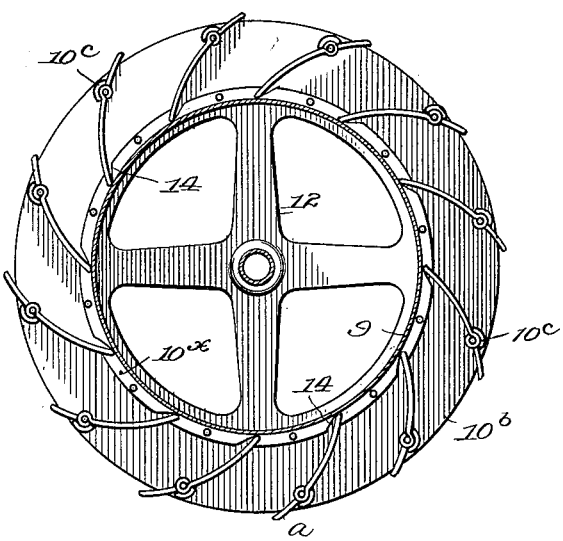
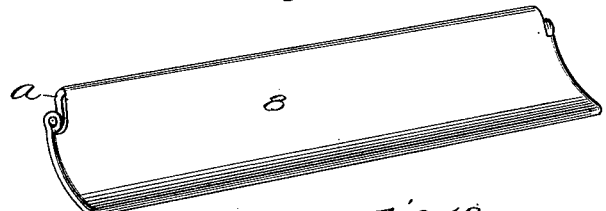
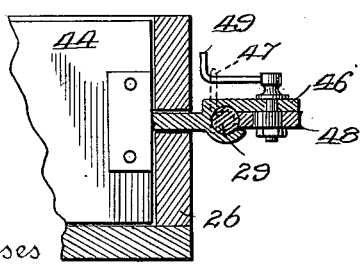
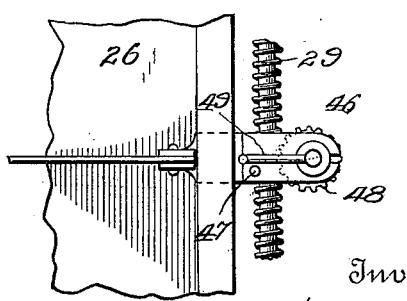
Inventor
Matthew J. F. Scanlan
By his Attorneys
THE NORRIS PETERS CO., PHOTO-LITHO., WASHINGTON, D. C.

UNITED STATES PATENT OFFICE.

MATTHEW J. F. SCANLAN, OF NEW YORK, N. Y.

COMBINED SNOW-PLOW AND DUMPING-CART.

SPECIFICATION forming part of Letters Patent No. 634,274, dated October 3, 1899.

Application filed August 18, 1898. Serial No. 688,899. (No model.)

*To all whom it may concern:*

Be it known that I, MATTHEW J. F. SCANLAN, a citizen of the United States, residing at New York, in the county of New York and State of New York, have invented certain new and useful Improvements in a Combined Snow-Plow and Dumping-Cart, of which the following is a specification, reference being had therein to the accompanying drawings.

My invention relates to a combined snow-plow and dumping cart or wagon, the object being to provide effective means for gathering or scooping up the snow, conveying it rearward to a cart or wagon, and ejecting it from the latter.

The characteristic features of the invention, as well as its details of construction, will be fully described hereinafter and defined in the appended claims.

Figure 3:
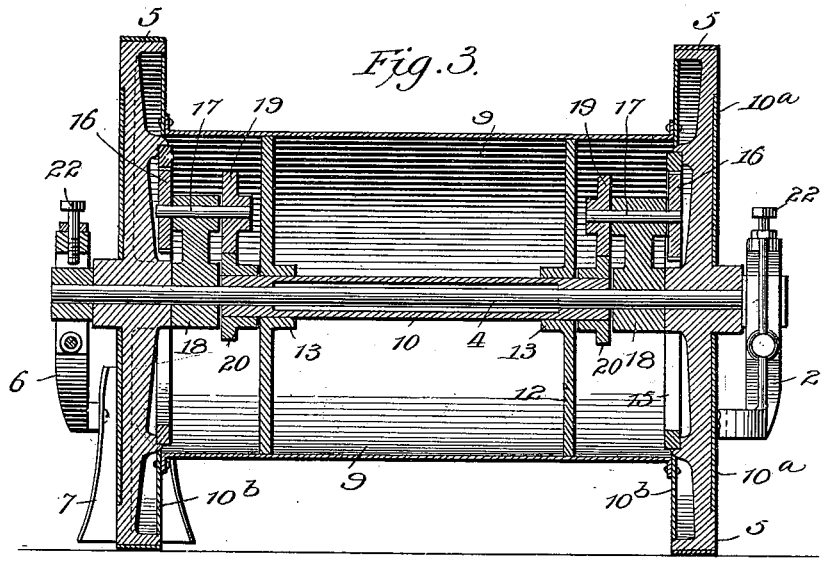
Figure 4:
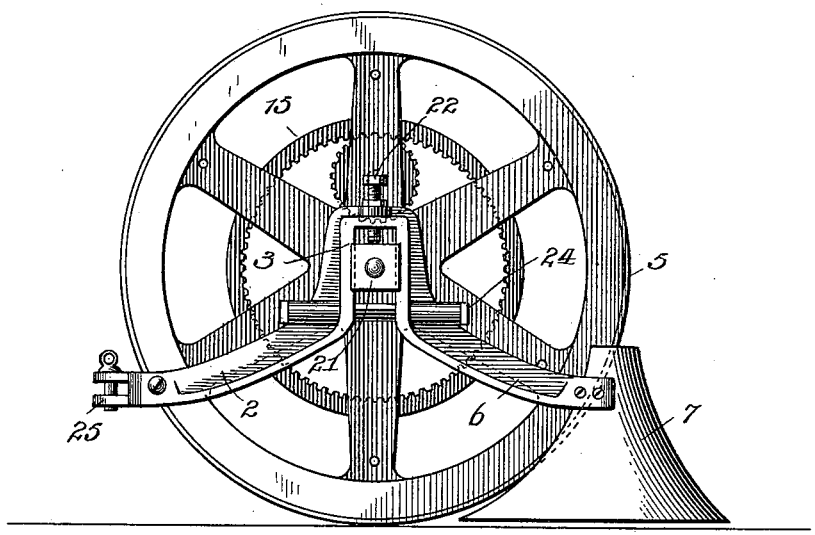
Figure 5:
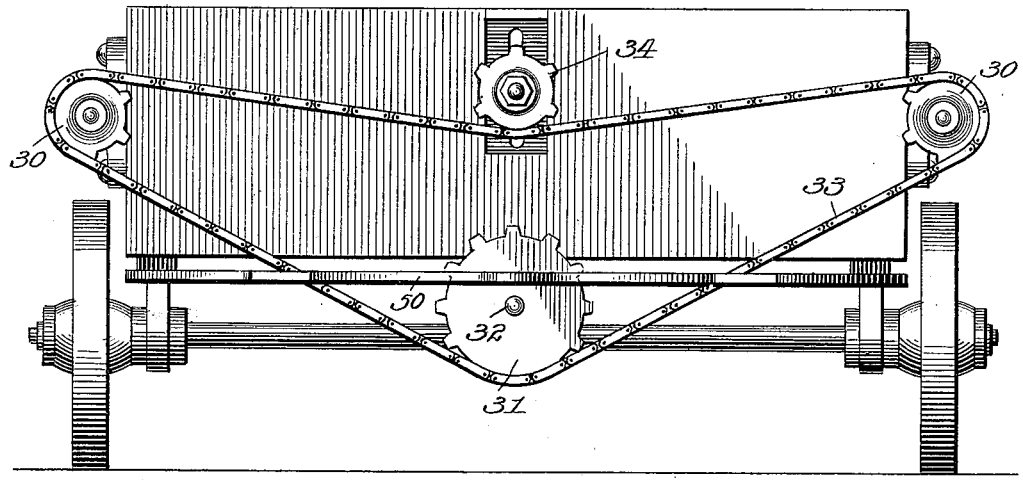

In the accompanying drawings, Figure 1 is a side elevation of the snow-plow and receiving-vehicle connected together. Fig. 2 is a plan view of the same. Fig. 3 is a longitudinal section of the plow. Fig. 4 is an end elevation of the plow with the protecting-disk removed. Fig. 5 is a front end elevation of the wagon, and Figs. 6 to 12 are detail views.

The frame of the snow-plow consists of a yoke comprising a cross-bar 1 and parallel sides 2, each of the latter being upwardly bent at about its longitudinal center to form a guide 3 to provide for the attachment of the frame to the ends of an axle 4, carrying traction-wheels 5. The front ends 6 of the side bars of the frame are deflected or curved downwardly to support the shovels 7, which are of suitable construction to enter and dislodge the snow and direct it into the path of the blades or scoops 8 of a revoluble conveyer, which consists of a drum 9, arranged upon a sleeve 10, mounted on the axle 4, concentric with the traction-wheels 5 and the series of transverse blades or scoops 8. The drum 9 is provided near each end with a spider 12, having a central bearing 13, through which the sleeve 10 extends.

While I do not restrict the invention to any specific means for attaching the curved blades or scoops to the drum, I preferably form the peripheral flanges $10^\times$ of the drum with series of curved slots or grooves 14, arranged at an angle to the radius of the drum, and pivotally secure the inner edges of the blades within said grooves or slots, as shown in Fig. 9.

The traction-wheels are each provided with protecting-disks $10^a$ on their outer faces and with protecting-rings $10^b$ on their inner faces. These rings $10^b$ are each formed with curved flanges or seats $10^c$, which coöperate with the grooves 14 in the drum-flanges to support the scoops. Each of the scoops consists of a wire frame $a$, covered with sheet metal, wire-netting, or other suitable material. In practice I prefer to employ both sheet metal and wire-netting to form the scoops, alternating them, as best shown in Fig. 2.

As shown in Figs. 3 and 4, the wheels 5 are provided on their inner faces with internal gear-wheels 15, within which are arranged gear-pinions 16, mounted upon the outer ends of shafts 17, supported by brackets 18 from the axle. Upon the inner ends of these shafts 17 are also mounted gear-pinions 19, meshing with pinions 20, mounted upon the ends of the sleeve 10. This gearing is so proportioned that the drum will be revolved more rapidly than the traction-wheels, the ratio being preferably as one to three.

To provide for the vertical adjustment of the shovels 7 and their supporting-frame, the guides 3 of the frame fit over the squared nuts 21 on the ends of the axle, and an adjusting-screw 22 passes through the top portion 23 of the guide, with its lower end impinging against the upper side of the nut 21. A bolt 24 connects the lower ends of the sides of the guide, as clearly shown in Fig. 4.

The cross-bar 1 of the plow-frame is provided at its rear side with a centrally-projecting eye 25 to permit of its pivotal attachment by any suitable coupling device to the cart or wagon 26.

The sides of the wagon are formed with longitudinal slots 27 and provided near their ends with bracket-bearings 28, within which are supported the ends of worm-shafts 29, upon the front ends of which are mounted sprocket-pinions 30. As clearly shown in Figs. 1 and 2, the worm-shafts 29 project slightly beyond the front end of the wagon, so that their pinions 30 will rest in horizontal alinement and in the vertical plane of a sprocket-wheel 31, mounted upon the front end of a shaft 32, supported in suitable bearings below the bed of the wagon. A sprocket-chain 33 connects the wheel 31 and pinions 30, and said chain also travels in contact with an idler-sprocket 34, supported at the front end of the wagon to take up slack in said chain.

Figure 6:
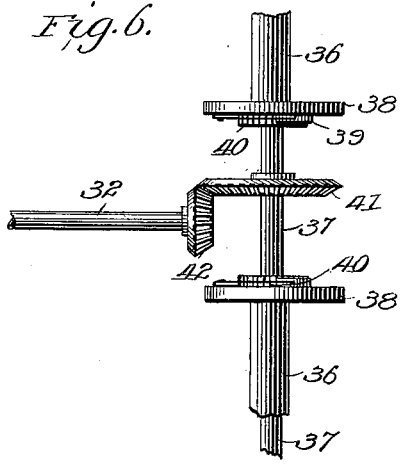
Figure 7:
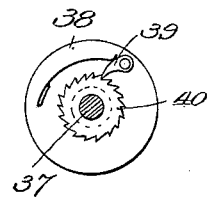

The shaft 32 is revolved from the rear axle of the wagon by the mechanism illustrated in Figs. 6 and 7. The rear wheels 35 of the wagon are mounted upon sleeves 36, fitting upon the ends of the rear axle 37 and provided at their inner ends with disks 38, each of which carries a pawl 39, adapted to engage ratchet-wheels 40, fixed upon the axle. Upon the axle 37 is also mounted a bevel gear-wheel 41, which meshes with a bevel gear-pinion 42 on the rear end of the shaft 32. The axle 37 is provided at each end beyond the wheels 35 with crank-handles 43 for the purpose of revolving the shaft 32 by hand when desired.

Referring now to Figs. 1 and 2, 44 and 45 designate movable partitions located within the wagon and provided at their ends with ears 46, which extend through the slots in the sides of the wagon and embrace the worm-shafts 29. Pins 47, extending through the ears 46, engage the worms on the shafts 29, so that the revolution of the shafts operates to move the partitions in the direction of the arrows in Fig. 2. Between the ears 46 are mounted gear-wheels 48, adapted to mesh with the worm-shafts and provided with crank-handles 49, so that the partitions may be moved in either direction by hand when the wagon is at rest.

The front of the wagon is provided with an extension 50, having a central coupling lug or eye 51 for securing the wagon to the eye 25 of the plow-frame.

The operation of the mechanism is obvious from the foregoing description, in connection with the accompanying drawings, it being understood that the rotation of the plow is in the direction of the arrow shown in Fig. 2 to convey the snow rearward to the wagon and that the movable partitions (one or more of which may be employed) serve to push the snow rearward and pack it in the wagon.

The wagon is preferably provided with a hinged end-gate 53, adapted to be secured by buttons 54.

The pins 47 are removable and are taken out when the partitions are to be moved by the handles 49. The partitions will be arranged close together at the forward end of the wagon, and the snow will be taken up and deposited in the front part of the wagon. After a sufficient quantity of snow has been deposited the pins 47 are inserted, and the partition (one or more) by the operation of the screws will be carried rearward, compressing the snow as much as may be desired, after which the pin 47 will be removed and the partition allowed to remain stationary. This operation is continued until the wagon is loaded. After removing the pins 47 the forward motion of the wagon will revolve the screws 29 and the handles 49 without causing the partitions to move. Thus the handles are only used to operate the partitions when the screws are at rest, or by inserting the pins 47 and using the crank 43 the same result could be accomplished.

While in view of the above explanation it is not necessary to throw the screws 29 out of gear when the wagon is loaded and driven away, this may be accomplished by raising the pawls 39 out of engagement with the ratchet-wheels 40, thus permitting the sleeves on the rear axle to revolve without revolving the gear 41 and shaft 32.

What I claim is—

1. A revoluble snow-plow, comprising a drum, and a series of blades or scoops, arranged thereon, in combination with traction-wheels at the ends of said drum, gearing between the traction-wheels and drum for rotating the latter at a higher speed than said wheels, vertically-adjustable shovels arranged in front of the wheels, and a vehicle or receptacle in rear of the revolving plow.

2. In a snow-plow, the combination with an axle and traction-wheels thereon, of a sleeve on said axle, a rotary snow-plow comprising a drum mounted on said sleeve and provided with scoops, gearing between the wheels and said drum, a frame adjustably secured to the ends of the axle, and shovels carried by said frame.

3. The combination with a revoluble snow-plow, of a wagon arranged in rear thereof, said wagon having its sides slotted longitudinally, worm-shafts mounted in supports on the sides of the wagon opposite the slots thereof, a transverse partition within the wagon having projecting ears at its ends extending through said slots, and provided with means for engaging said worm-shafts, and gearing operated from the axle of the wagon for revolving said shafts.

4. The combination with a revoluble snow-plow, of a wagon coupled to the rear of the plow and comprising a bed having its sides each formed with a longitudinal slot, worm-shafts in line with said slots, a longitudinal shaft below the bed, and gearing at the front end of the wagon for revolving said shafts, a partition projecting at its ends through said slots, and provided with means for engaging said worm-shafts, and gearing between the rear axle and the rear end of the longitudinal shaft for revolving the latter.

5 In a combined snow-plow and wagon, the combination with the slotted sides of the bed, and the transverse partition provided with ears at its ends, of the worm-shafts, and gear-wheels mounted between said ears and provided with crank-handles.

In testimony whereof I affix my signature in presence of two witnesses.

MATTHEW J. F. SCANLAN.

Witnesses:
ERNEST SPITZERT,
WILLIAM GILBERT.